United States Patent [19]

Nakajima

[11] 4,217,866
[45] Aug. 19, 1980

[54] FOUR-STROKE RECIPROCATORY INTERNAL COMBUSTION ENGINE AND METHOD OF OPERATING SUCH AN ENGINE

[75] Inventor: Yasuo Nakajima, Yokosuka, Japan

[73] Assignee: Nissan Motor Company, Limited, Yokohama City, Japan

[21] Appl. No.: 849,509

[22] Filed: Nov. 7, 1977

[30] Foreign Application Priority Data

Nov. 8, 1976 [JP] Japan .................. 51-133856
Dec. 15, 1976 [JP] Japan .................. 51-151381

[51] Int. Cl.² .................. F02B 25/00; F02B 41/00
[52] U.S. Cl. .................. 123/432; 123/26; 123/76; 123/308
[58] Field of Search .......... 123/75 B, 76, 26, 30 C, 123/124 R, 119 C, 119 D

[56] References Cited

U.S. PATENT DOCUMENTS

| | | | |
|---|---|---|---|
| 1,048,922 | 12/1912 | Westaway | 123/76 |
| 1,138,077 | 5/1915 | Buchi | 123/75 B UX |
| 1,297,248 | 3/1919 | Ricardo | 123/75 B |
| 1,431,547 | 10/1922 | Smith | 123/76 |
| 1,512,710 | 10/1924 | Potter | 123/75 B |
| 1,576,357 | 3/1926 | Piece | 123/75 B |
| 2,477,173 | 7/1949 | Farkas | 123/65 B |
| 2,818,931 | 11/1958 | Mallory | 123/75 B |
| 3,046,960 | 7/1962 | Dolza | 123/76 |
| 3,046,961 | 7/1962 | Dolza | 123/76 |
| 3,182,645 | 5/1965 | Wilson | 123/76 |
| 3,363,612 | 1/1968 | Brenneke | 123/76 |
| 3,443,552 | 5/1969 | Von Seggern et al. | 123/75 B |
| 3,814,065 | 6/1974 | Gospodar | 123/75 B |
| 3,964,451 | 6/1976 | Goto | 123/75 B |
| 3,967,611 | 7/1976 | Goto | 123/75 B |

FOREIGN PATENT DOCUMENTS

160848 11/1903 Fed. Rep. of Germany.
353093 5/1922 Fed. Rep. of Germany.
586119 10/1933 Fed. Rep. of Germany.
674142 4/1939 Fed. Rep. of Germany.
2123074 12/1971 Fed. Rep. of Germany.

Primary Examiner—Ira S. Lazarus
Attorney, Agent, or Firm—Schwartz, Jeffery, Schwaab, Mack, Blumenthal & Koch

[57] ABSTRACT

A four-stroke reciprocatory internal combustion engine has a scavenging phase in which air is admitted under pressure into the cylinder and has a swirl generating phase in which a high-speed jet of air is admitted under pressure into the cylinder so as to swirl air fuel mixture charge in the cylinder around the cylinder axis. The engine has, in addition to an intake valve that controls induction of air fuel mixture into the cylinder, a separate air inlet valve which effects the scavenging phase and swirl generating phase.

40 Claims, 16 Drawing Figures

FOUR-STROKE RECIPROCATORY INTERNAL COMBUSTION ENGINE AND METHOD OF OPERATING SUCH AN ENGINE

BACKGROUND OF THE INVENTION

This invention relates to a four-stroke reciprocatory internal combustion engine and to a method of operating such a four-stroke reciprocatory internal combustion engine.

The permissible limits of exhaust emissions in certain countries such as Japan are shown in the following tabulation:

|  | HC g/mile | CO g/mile | NOx g/mile |
|---|---|---|---|
| 1978 standard (Japan) | 0.40 | 3.36 | 0.40 |

Car manufactures are now striving hard to develop a fuel economy engine which meets the above stringent standard.

In present spark ignition internal combustion engines under idle and deceleration conditions the air fuel ratio (A/F) of the charge in the cylinder must be kept rich enough to allow the engine to run smoothly because under these conditions the rate of residual gas of the charge in the cylinder increases abruptly. Empirically it is known that the engine stability is directly affected by G/F, rather than A/F, of the charge in the cylinder, where, G=(intake air content)+(residual gas content), and that there is optimum range of G/F around which the engine runs smoothly. In practice, the A/F of the charge in the cylinder is kept excessively rich and the rate of residual gas of the charge is considerably great under idle and deceleration conditions so that the exhaust gas resulting from the combustion of the charge will contain high HC and CO under these conditions. To reduce CO and HC, it is therefore necessary to supply secondary air under idle and deceleration conditions for facilitating oxidation reaction of CO and HC in an exhaust gas treatment device.

If, under idle and deceleration conditions, the engine can run smoothly when the A/F of the charge in the cylinder is around the stoichiometry, CO and HC levels will be lowered. This, however, is not yet accomplished and its accomplishment is strongly desired for the purpose of providing a fuel economy low emission engine.

It is also desired to operate the engine, under part load conditions, on the charge whose A/F is around the stoichometry.

To attain fuel economy of a car, it is effective to reduce the volume of the cylinder. So, it is desired to increase the power output of the engine under full load conditions.

PRIOR ART

It has been proposed, for the purpose of preventing knocking, to admit air, under pressure, into the cylinder during the end portion of the compression stroke to keep the charge in the cylinder cool and again during the end portion of the exhaust stroke to cool the exhaust valve and spark plug. The problem resides in that high charging pressure, i.e., pressure above 10 kg/cm$^2$, is necessary for the admission of air into the cylinder during the end portion of the compression stroke.

It has also been proposed, for the purpose of expelling the residual gas from the cylinder, to admit air, under pressure, into the cylinder during the exhaust stroke.

It has also been proposed, for facilitating oxidation of HC and CO contents of the exhaust gas, to admit air, under pressure, into the cylinder during the end portion of the expansion stroke and the exhaust stroke.

It has been proposed that an air fuel mixture is inducted into the cylinder through an intake valve to swirl around the cylinder axis in one direction and that air is admitted under atmospheric pressure through an air inlet valve during the beginning portion of the intake stroke to swirl around the cylinder axis in the opposite direction to produce a stratified charge comprising an ignitable cloud in the proximity of a spark plug.

It has been proposed that an air fuel mixture is inducted into the cylinder through an intake valve during the intake stroke and that air is admitted under atmospheric pressure through an air inlet valve to swirl around the cylinder axis to produce a stratified charge comprising an ignitable cloud in the proximity of a spark plug and to accomplish fast combustion of the charge in the cylinder.

It has been proposed that an air fuel mixture is inducted into the cylinder through an intake valve to swirl around the cylinder axis and that air, in a jet form, is admitted under atmospheric pressure through an air inlet valve all through the intake stroke to swirl within a plane substantially parallel to the cylinder axis to accomplish fast combustion. The jet of air is directed toward the electrode of the spark plug to scavenge the same.

SUMMARY OF THE INVENTION

It is an object of this invention to improve fuel economy of a reciprocatory internal combustion engine.

It is another object of this invention to improve fuel economy of a reciprocatory internal combustion engine and to reduce emission levels of the engine below the stringent 1978 standard in Japan.

According to this invention, the admission of air, under pressure, into the cylinder of a reciprocatory internal combustion engine is effected to scavenge the cylinder during the exhaust stroke, the induction of air fuel mixture being effected during the intake stroke, while air is admitted under pressure, into the cylinder to cause the charge in the cylinder to swirl generally around the cylinder axis. Because the residual gas fraction of the charge in the cylinder is replaced with the same amount of pure air, the combustion efficiency has been improved under part load, idle and deceleration conditions and fuel consumption and emission levels have been reduced. Under full load conditions, the rate of fuel of the charge in the cylinder can be increased because there exists substantially no residual gas as a result of the replacement of the residual gas fraction of the charge by the same amount of pure air, increasing the power output and torque of the engine under these conditions.

It is another object of this invention to scavenge the cylinder of a reciprocatory internal combustion engine under all operating conditions of the engine.

It is another object of this invention to provide a reciprocatory internal combustion engine having an intake valve for the induction of air fuel mixture and an the air inlet valve for the admission under pressure of air. Because swirl of the charge in the cylinder is produced by a high-speed jet of air from the air inlet valve, an intake arrangement to impart a force to the air fuel mixture as it flows past the intake valve, which would increase resistance to the inflowing mixture, is unnecessary in the engine of the invention.

It is another object of this invention to precisely control the amount of air per each admission of air into the cylinder of a reciprocatory internal combustion engine in response to engine operating conditions to meet the amount of residual gas which varies against the variation of loads and engine speed.

It is another object of the invention to reduce the cubic capacity of a reciprocatory internal combustion engine with the same power output.

It is another object of the invention to provide a reciprocatory internal combustion engine for automobiles which is fuel-stingy and capable of producing high power.

It is another object of the invention to provide a reciprocatory internal combustion engine which runs smoothly on the charge and having an A/F not less than stoichometry under idle and deceleration conditions.

BRIEF DESCRIPTION OF THE DRAWINGS

The invention is hereinafter particularly described with reference to the accompanying drawings, in which.

DETAILED DESCRIPTION OF THE PREFERRED EMBODIMENTS

Figures 1, 2A:
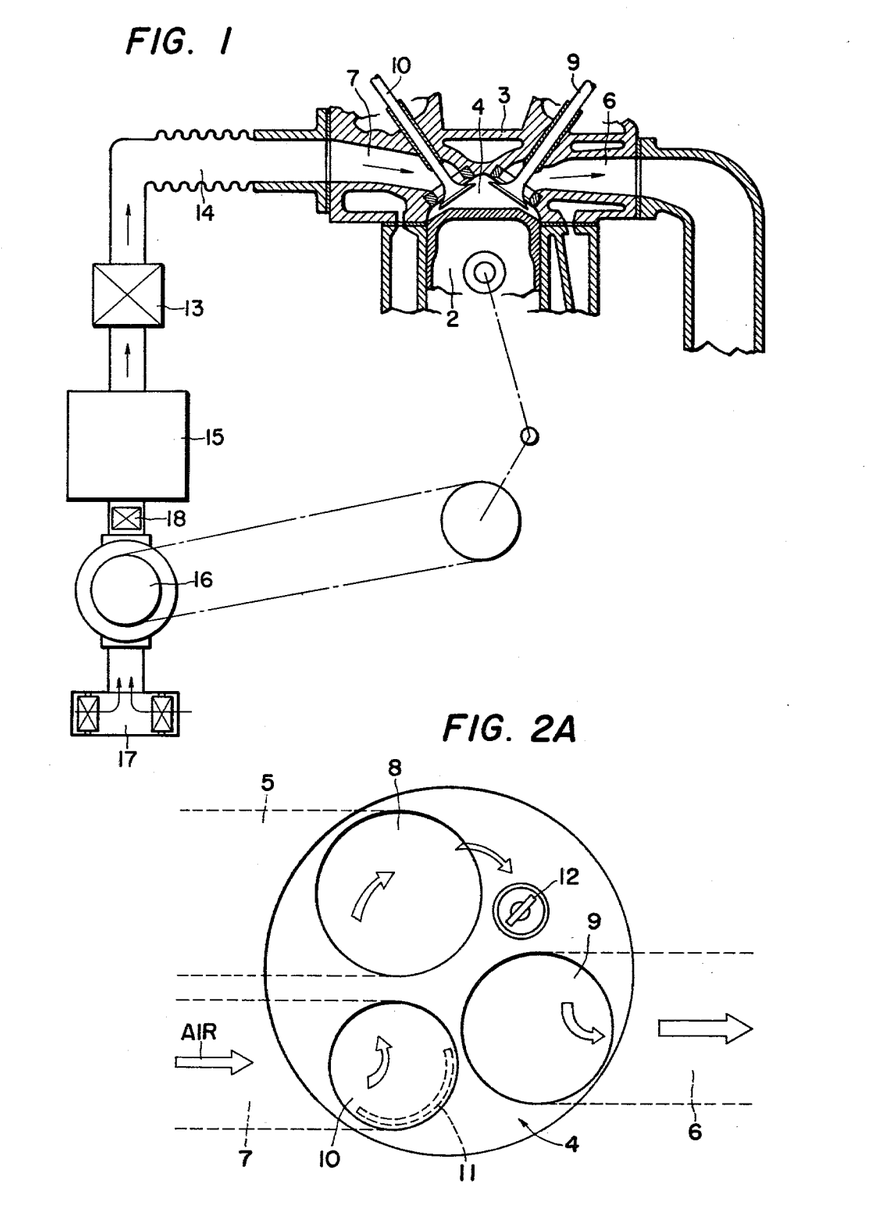
FIG. 1 is a diagrammatic view of a four-stroke reciprocatory internal combustion engine of the invention.
FIG. 2A is a top plan view of a valve arrangement of the internal combustion engine shown in FIG. 1.

Referring to FIGS. 1 and 2A of the accompanying drawings, a four-stroke internal combustion engine comprises a cylinder 1, a piston 2 reciprocating in the cylinder and a cylinder head 3 secured to the cylinder. The cylinder 1, piston 2 and cylinder head 3 cooperate to form a combustion chamber 4.

The cylinder head 3 has an intake port bore 5, an exhaust port bore 6, an additional intake port bore 7 all opening to the combustion chamber 1. An intake valve 8 cooperating with the intake port bore 5, an exhaust valve 9 and an air inlet valve 10 cooperating with the additional intake port bore 7 are supported in the cylinder head. As shown in FIG. 2A, in order to impart a force to inflowing air to swirl generally around the cylinder axis, the air inlet valve 10 has a valve shroud 11. The head of the intake valve 8 is disposed downstream of the head of the intake valve 8 is disposed downstream of the head of the air inlet valve 10 with respect to the swirling air (see arrows shown in FIG. 2A), the head of the exhaust valve 9 is disposed downstream of the head of the intake valve 8 with respect to the swirling air, and the electrode of a spark plug 12 is exposed to the combustion chamber 1 at a location positioned downstream of the head of the intake valve 8 and upstream of the head of the exhaust valve 9 with respect to the swirling air.

During a scavenging phase which overlaps the exhaust stroke the air inlet valve 10 opens to admit air under pressure into the cylinder 1 through the additional intake port bore 7 to scavenge the cylinder 1 by expelling the exhaust gas from the cylinder 1 through the exhaust port bore 6 because the exhaust valve 9 remains open. Because the scavenging air swirls around the cylinder axis in a manner to expel the exhaust gas toward the exhaust port bore 6 in the valve arrangement shown in FIG. 2A, the scavenging efficiency is quite high with this valve arrangement.

During the intake stroke the intake valve 8 opens and the piston 2 draws an air fuel mixture into the cylinder 1 through the intake port bore 5.

During a swirl generating phase which overlaps the intake stroke the air inlet valve 10 opens to admit a high-speed jet of air into the cylinder 1 under pressure through the additional intake port bore 7 so as to swirl the air fuel mixture generally around the cylinder axis.

Figure 3:
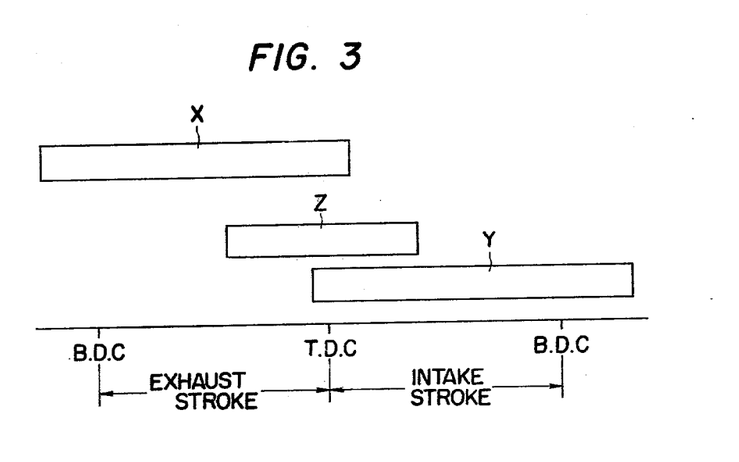
FIG. 3 is a valve timing diagram of the intake, exhaust and air inlet valves of the engine shown in FIG. 1.

FIG. 3 shows by way of example a timing diagram for the exhaust valve 9, intake valve 8 and air inlet valve 10. The opening period of the exhaust valve 9 and the opening period of the intake valve 8 are denoted by X and Y, respectively, while the opening period of the air inlet valve 10 is denoted by Z. The air inlet valve 10 opens to initiate the scavenging phase and closes to terminate the succeeding swirl generating phase. In this example the swirl generating phase overlaps and succeeds the scavenging phase.

Because, in a conventional reciprocatory internal combustion engine, the rate of residual gas of the charge in a cylinder varies against the variations of the engine operating conditions, it is preferable to control the amount, by weight, of air to be admitted into the cylinder 1 through the additional intake port 7 upon each opening period of the air inlet valve 9 in response to operating conditions of the engine.

To this end a flow control device 13 is provided to control fluid flow through a conduit 14 connecting the outlet of a surge tank 15 to the additional intake port bore 7, see FIG. 1. An air pump 16 draws in the atmospheric air through an air cleaner 17 and transfers it toward the additional intake port bore 7 through a check valve 18, surge tank 15 and conduit 14 under pressure above atmospheric pressure (about 1.2–2.0 kg/cm$^2$). The air pump 16 is connected to the engine crankshaft of the engine through a mechanical drive to be actuated thereby. Alternatively, an air compressor may be used instead of the air pump. The air compressor is connected to a turbine disposed in the engine exhaust system with a shaft similar to that used on the present turbo-charged engine.

Figure 8:
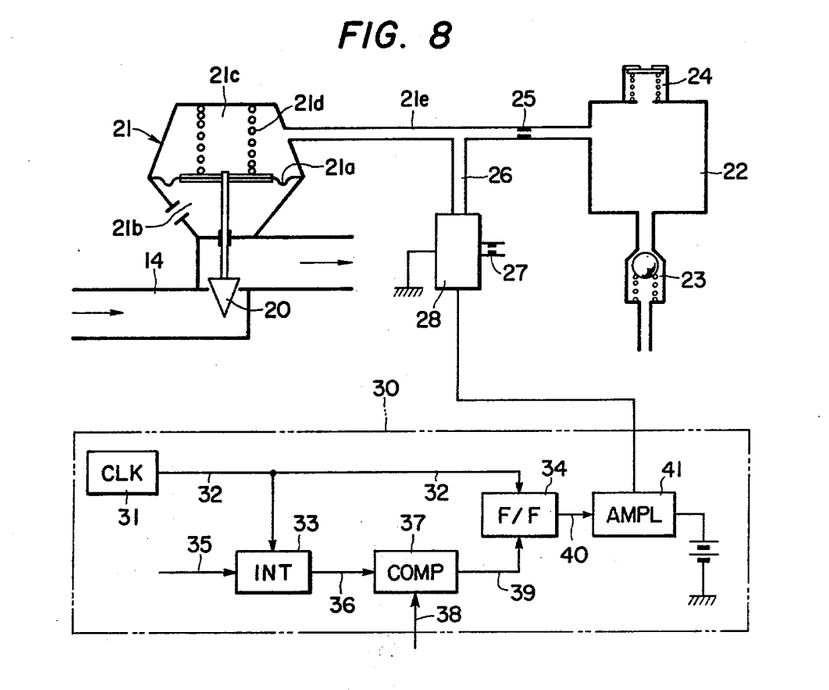
FIG. 8 is a diagrammatic view of the flow control device shown in FIG. 1.
Figure 9A:
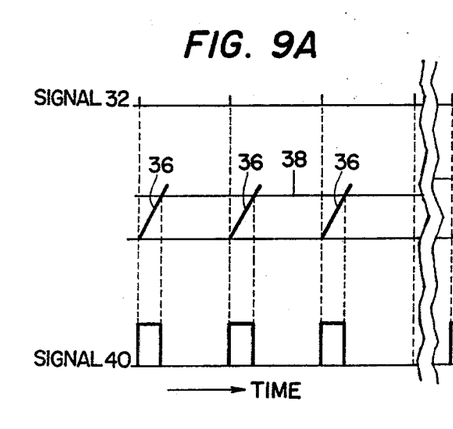
FIGS. 9A and 9B are timing diagrams of signals from the control circuit shown in FIG. 8.
Figure 9B:
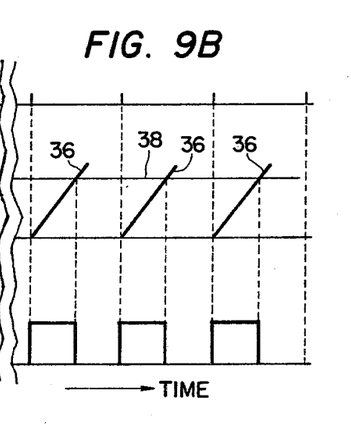
Figure 10:
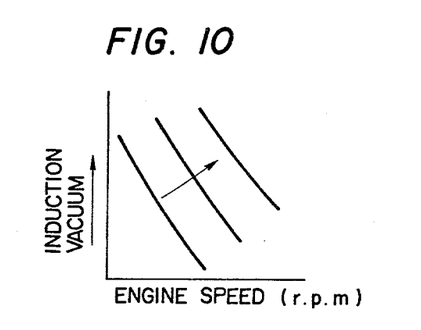
FIG. 10 is a graph showing the required admission of air through the additional intake port as a function of the engine speed and induction vacuum.

Going into to the detail of the flow control device 13 taking reference to FIGS. 8 to 10, a flow control valve 20 is fluidly disposed in the conduit 14 (see FIG. 8). A vacuum servo 21 is mounted to the conduit 14 and has a diaphragm 21a to which the valve stem of the valve 20 is fixedly connected, an atmospheric chamber 21b below (viewing FIG. 8) the diaphragm 21a, a vacuum chamber 21c above (viewing FIG. 8) the diaphragm 21a, and a spring 21d mounted within the vacuum chamber 21c to act against the diaphragm 21a to bias the valve 20 to the illustrated close position in which the conduit 14 is closed by the valve 20. A vacuum conduit 21e connects the outlet of a source of constant vacuum, in the form of a vacuum accumulator 22, to the vacuum chamber 21c. The vacuum accumulator 22 is connected to the source of the engine induction vacuum through a check valve 23. A pressure regulator 24 is mounted to the vacuum accumulator 22 to keep the pressure within the accumulator 22 constant irrespective of the engine operating conditions. The vacuum conduit 21e is provided with an orifice 25 therein and an air bleed conduit 26 has one end connected to the vacuum conduit 21e at a location intermediate the orifice 25 and the vacuum chamber 21c. An air bleed orifice 27 is provided within the air bleed conduit 26 at an opposite end thereof. A solenoid valve 28 is arranged to control flow through the air bleed conduit 26. When not energized, the solenoid valve 28 closes the air bleed conduit 26, while, when energized, it opens the air bleed conduit 26. A control circuit 30, only diagrammatically shown in FIG. 8, is electrically circuited with the solenoid valve 28.

The control circuit 30 shown in FIG. 8 comprises a clock counter 31 which generates a reset signal 32 at regular intervals. The reset signal 32 is fed to an integrator 33 and also to a flip flop 34 to reset them. An electrical signal 35 representing the engine speed (the engine r.p.m.) is fed to the integrator 33. An output signal 40 voltage 36 from the integrator 33 rises at a faster rate when the engine speed is high than when the engine speed is low. This output signal voltage 36 is fed to a comparator 37 to which a reference signal voltage 38 representing the engine induction vacuum is fed. The reference signal voltage 38 is higher when the engine induction vacuum is high, i.e., when engine load is low, than when the induction vacuum is low, i.e., when engine load is high. The comparator 37 feeds a reset signal 39 to the flip flop 34 when the signal 36 exceeds the signal 38. Since time period after the instance of the reset signal 32 to the instance of the reset signal 39 is variable in response to the engine speed and induction vacuum, the flip flop 34 will produce a pulse signal 40 having a pulse width variable in response to the engine speed and induction vacuum. This pulse signal 40 is amplified by means of an amplifier 41 and then used to energize the solenoid valve 28 so that the solenoid will be energized for a time corresponding to the pulse width.

FIG. 9A shows a timing diagram representing the condition that the engine speed is high and induction vacuum is low, while FIG. 9B a timing diagram representing the condition that the engine speed is low and induction vacuum is high. FIG. 10 shows a graph plotting the required amount of scavenging air for expelling the residual gas from a cylinder as against the engine speed and induction vacuum. It will now be understood that with the valve 20 the amount of air to be admitted into the cylinder 1 through the additional intake port bore 7 under the control of the air inlet valve 10 (see FIG. 1). will be varied along the graph shown in FIG. 10.

It is found that the best scavenging efficiency has been obtained when more than 50%, by weight, of the total amount, by weight, of air admitted during each opening period of the air inlet valve 10 is admitted into the cylinder 1 during the scavenging phase before the top dead center position of the piston 2. This can be effected by selecting a cam profile or a valve timing for the air inlet valve 10.

As will be noted from the timing diagram shown in FIG. 3, because the exhaust valve 9 is closing when the air inlet valve 10 begins to open and is almost closed at the top dead center position, the scavenging efficiency is decreased abruptly as the piston 2 approaches the top dead center.

When the intake valve 8 begins to open, the exhaust gas tends to be drawn into the intake port bore 5 due to vacuum in the intake manifold, and the scavenging efficiency is quite low under this condition.

Thus it will be understood that for the purpose of increasing the scavenging efficiency the cam profile for the air inlet valve 9 should be desinged so that right after the opening of the air inlet valve 9 a great amount of air is admitted into the cylinder 1 to thereby expel as much residual gas from the cylinder as possible before the opening of the intake valve 8.

The opening degree of the air inlet valve 9 should be reduced when the intake valve 8 is opening to increase the inflow velocity of air thereby generating a strong swirl which is effective in increasing the combustion speed.

Figure 4A:
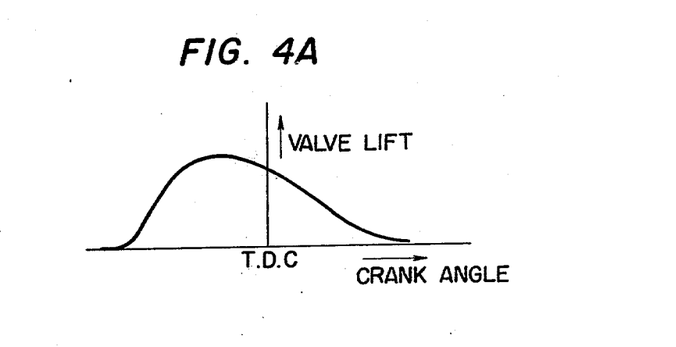
FIG. 4A is a valve lift diagram of the air inlet valve.

Therefore, as shown in FIG. 4A the valve lift diagram for the air inlet valve 9 should preferably be set so that a great amount of air is admitted into the cylinder 1 at the initial stage of the valve opening period and more than 50% air, of the total amount of air to be admitted during per each opening period of the air inlet valve 10, is admitted into the cylinder before the top dead center and high velocity inflow is obtained at the final stage of the valve opening period. It will be noted in FIG. 4A that the maximum valve lift before the top dead center is higher than the maximum valve lift after the top dead center.

Figure 4B:
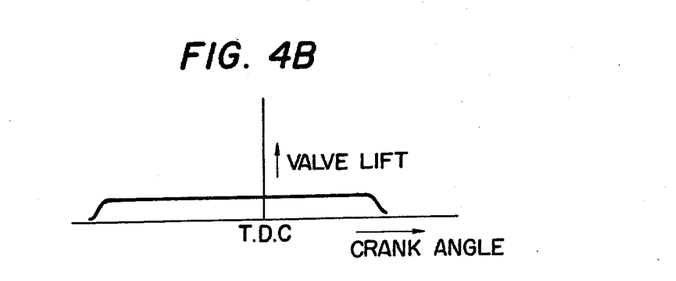
FIG. 4B is a similar view to FIG. 4A showing another example.

If it is possible to admit more than 50% air, of the total amount of air to be admitted during per each opening period of the air inlet valve 10, into the cylinder bedore the top dead center, the valve lift diagram shown in FIG. 4B is acceptable.

Referring again to FIG. 3, the relationship between the opening periods X and Y of the exhaust and intake valves 9 and 8 is substantially the same as the conventional engines. The opening timing of the intake valve 8 may be delayed slightly, if desired. The scavenging efficiency is increased when the closing timing of the exhaust valve 9 is delayed to increase the valve overlap between the exhaust and air inlet valves 9 and 10. Power output is increased when the closing timing of the air inlet valve 10 is delayed to increase the amount of air within the cylinder 1.

Figure 7:
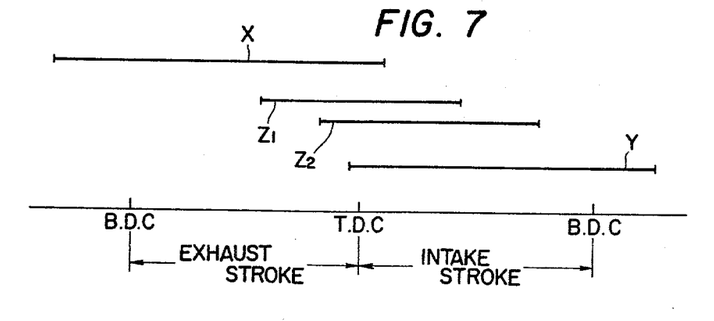
FIG. 7 is a valve timing diagram of the intake, exhaust and air inlet valves of the engine shown in FIG. 1.

Preferably, the valve overlap between the exhaust valve 8 and air inlet valve 9 is set to be longer under full load conditions than under part load conditions, as shown in FIG. 7 in which the opening periods of the air inlet valve 9 under full load conditions and under part load conditions are denoted by $Z_1$ and $Z_2$, respectively. This results in an increase of power output under full load conditions and in low fuel consumption and low emission under part load conditions.

The operation of the engine of this invention will be explained in the following description.

It is recognized that the rate of residual gas of the charge in a cylinder is more than 10% at low engine speed range under full load conditions, causing a low torque at this speed range, while, the rate residual gas at high speed range under full load conditions is not so high and ranges from 3% to 8%.

According to the invention, such residual gas is expelled from the cylinder 1 and replaced with pure air and the air fuel ratio of the air fuel mixture to be induced into the cylinder 1 is set, under full load conditions of the engine, so that the air fuel ratio of the charge in the cylinder 1 at the end of the intake stroke will become from about 12 to 14. As a result, the energy produced by one combustion process in the cylinder 1 is increased by an amount corresponding to the amount of residual gas expelled by pure air from the cylinder 1, and thus the engine of this invention produce more torque under full load conditions than the conventional engine, as shown in FIG. 5 in which the torque by the engine of this invention is shown by solid curve and that by the conventional engine by dashed curve.

Figure 5:
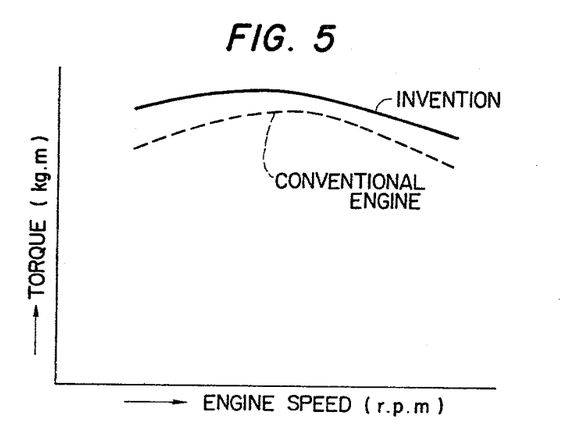
FIG. 5 is a graph showing a torque versus engine speed curve of the engine of the invention under full load conditions and that of the conventional engine.
Figure 6:
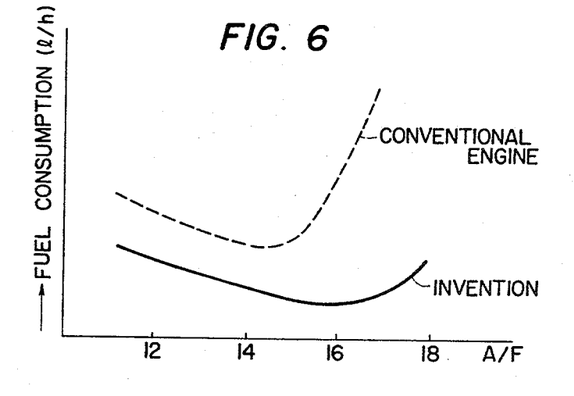
FIG. 6 is a graph showing a fuel consumption versus air fuel ratio curve of the engine of the invention under idle condition and that of the conventional engine.

The experimental result, as shown in FIG. 5, exhibits that torque has increased by 5% to 15% at low engine speed range under full load conditions and by 5% at high engine speed range under full load condition. This corresponds to an increase by 5% to 15% in actual cylinder stroke volume, and thus results in an increase of power per unit weight of the engine.

Under part load conditions, the air fuel ratio of air fuel mixture to be inducted into the cylinder 1 is set so that the air fuel ratio within the cylinder 1 at the end of the intake stroke will become not less than the stoichiometry. Stable combustion on such lean air fuel mixture is possible not only because of the replacement of the residual gas with air, but because of a swirl generated by air admitted into the cylinder through the auxiliary intake port bore 7 during the swirl generating phase. The swirl causes an increase of flame propagation speed, thus enabling completion of combustion of such lean air fuel mixture within a limited time. Because lean air fuel mixture is combusted with the presence of no residual gas under part load conditions, fuel consumption and HC and CO levels are lowered under these conditions. Because excess oxygen is present within the exhaust gas under part load conditions, admission of secondary air to promote oxidation of HC and Co is unnecessary. To reduce NOx level, it is necessary to effect exhaust gas recirculation under part load conditions.

It is recognized that the rate of residual gas of the charge in a cylinder is from about 15% to 30% under idle and deceleration conditions, causing unstable operation of an engine and frequent misfiring because of the dilution of the combustible mixture by such residual gas. Thus in the conventional engine it is impossible to operate the engine on the charge including a lean air fuel mixture under these conditions.

However, in the engine of this invention, because such increased residual gas is expelled and replaced with pure air and because air swirling around the cylinder axis causes an increase of flame propagation speed, stable combustion with lean air fuel mixture is possible under idle and deceleration conditions. As a result, fuel consumption and emission are lowered under these conditions.

Preferably, in the engine of this invention, the opening timing of the intake valve 8 is around the top dead center position or delayed under part load, idle and deceleration conditions to reduce the valve overlap between the intake and exhaust valves 8 and 9 so as to minimize mixing of the residual gas with fresh air fuel mixture.

Preferably the closing timing of the air inlet valve 10 is delayed under part load, idle and deceleration conditions than under full load conditions, to such a degree that the opening period of the air inlet valve 9 terminates at the final stage of the intake stroke (see FIG. 7), to elongate a swirl generating phase in which air is admitted, under pressure, into the cylinder 1 through the additional intake port 7 to swirl around the cylinder axis.

Figure 11:
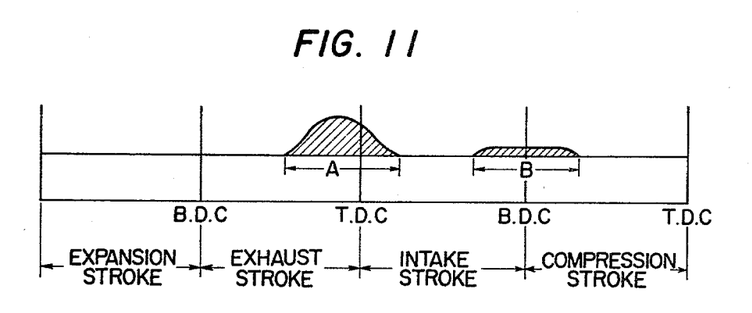
FIG. 11 is another example of a valve timing diagram of the air inlet valve of the engine shown in FIG. 1.
Figure 12:
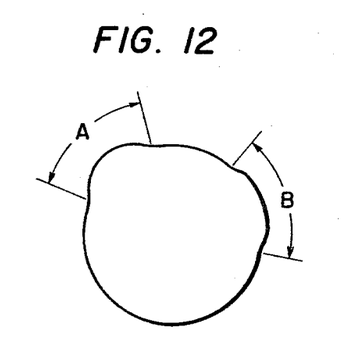
FIG. 12 is a cam for the air inlet valve and designed to follow the valve timing diagram shown in FIG. 11.

FIG. 11 shows another timing diagram for the air inlet valve 10. The opening period which overlaps the exhaust and intake stroke is denoted by A, and the opening period which overlaps the intake and compression stroke is denoted by B. The valve lift diagram for the opening period A and that for the opening period for the opening period B are also shown. FIG. 12 shows a cam profile for the air inlet valve 10 which has the timing diagram and lift diagram shown in FIG. 11.

During the opening period A, a scavenging phase takes place, while, during the opening period B, a swirl generating phase taken place. As will be noted from FIG. 11, the maximum valve lift during the opening period A is higher than the maximum valve lift during the opening period B so as to secure a scavenging air great enough to expel the residual gas during the scavenging phase and a high-speed jet of air, which swirls the charge in the cylinder 1 around the cylinder axis and lasts till the instance of ignition during the swirl generating phase.

The swirl generating phase initiates at the last half portion of the intake stroke and terminates at the front half of the compression stroke. Because the swirl generating phase will not occur during the first half or initial portion of the intake stroke, loss of volumetric efficiency of the air fuel mixture drawn into the cylinder 1 from the intake port bore 5 has been minimized. Because the swirl generating phase extends into the first half or initial of the compression stroke, swirl is sustained until the piston 2 approaches the top dead center during the compression stroke. This results in a power up, low fuel consumption and low emission under all operating conditions of the engine.

Figure 2B:
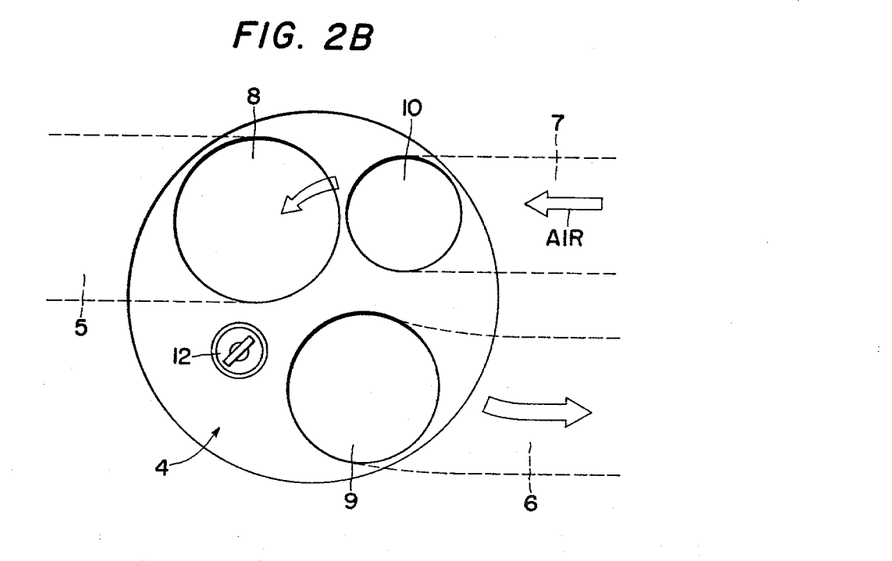
FIGS. 2B and 2C are similar views to FIG. 2A showing different examples.

Referring to FIG. 2B, there is shown an alternative example of a valve arrangement to that shown in FIG. 2A. The valve arrangement shown in FIG. 2B differs from that shown in FIG. 2A in that, instead of a valve shroud, an additional intake port bore 7 is arranged so as to direct inflowing air to pass along the cylindrical wall of a cylinder 1 so that air admitted into the cylinder through the additional intake port bore 7 will swirl around the cylinder axis.

Figure 2C:
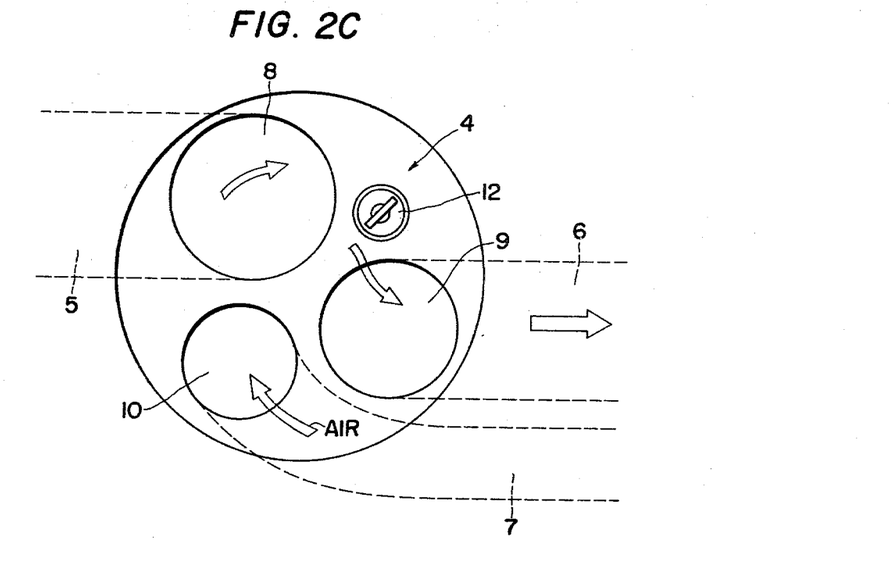

The valve arrangement shown in FIG. 2C differs from that shown in FIG. 2A in that, instead of a valve shroud, an additional intake port bore 7 is configured to impart a force to inflowing air to swirl around the cylinder axis.

What is claimed is:

1. A method of operating a four-stroke reciprocatory internal combustion engine having a cylinder with a piston reciprocating therein, said method comprising:
   a first step of admitting air under pressure into the cylinder during a scavenging phase which overlaps the final portion of the exhaust stroke of the piston so as to scavenge the cylinder;
   a second step of inducting air fuel mixture into the cylinder during the intake stroke of the piston; and
   a third step of admitting air under pressure into the cylinder during a swirl generating phase which overlaps a portion of the intake stroke of the piston which follows said exhaust stroke so that said air under pressure mixes with said air fuel mixture and causes the resultant charge to swirl around the cylinder axis.

2. A method as claimed in claim 1, in which said swirl generating phase overlaps and succeeds said scavenging phase.

3. A method as claimed in claim 1, in which the amount, by weight, of air admitted into the cylinder during said scavenging phase is dependent upon operating conditions of the engine.

4. A method as claimed in claim 2, in which the amount, by weight, of air admitted into the cylinder during said scavenging phase before the top dead center position of the piston is more than 50% of the total amount, by weight, of air admitted into the cylinder during said scavenging phase and the succeeding swirl generating phase.

5. A method as claimed in claim 2, in which the termination of said swirl generating phase is delayed under part load conditions, idle condition and deceleration conditions, relative to said termination under full load conditions of the engine.

6. A method as claimed in claim 5, in which, under full load conditions of the engine, the air fuel ratio of said air fuel mixture is set so that the air fuel ratio within said cylinder at the end of the intake stroke is from 12 to 14, and in which, under part load conditions of the engine, the air fuel ratio of said air fuel mixture is set so that the air fuel ratio within said cylinder at the end of the intake stroke is not less than the stoichiometry.

7. A method as claimed in claim 1, in which said swirl generating phase overlaps the compression stroke too.

8. A method as claimed in claim 2, in which there is provided an air inlet valve which opens to initiate said scavenging phase and closes to terminate said swirl generating phase.

9. A method as claimed in claim 8, in which the maximum valve lift of said air inlet valve during said scavenging phase before the top dead center position of said piston is higher than during said swirl generating phase after the top dead center position of said piston.

10. A method as claimed in claim 7, in which there is provided an air inlet valve which opens to initiate said scavenging phase and closes to terminate said swirl generating phase and which opens again to initiate said swirl generating phase and then closes to terminate said swirl generating phase.

11. A method as claimed in claim 10, in which the maximum valve lift of said air inlet valve during said scavenging phase is higher than the maximum valve lift of said air inlet valve during said swirl generating phase.

12. A method of operating a four-stroke reciprocatory internal combustion engine having a cylinder with a piston reciprocating therein, said method comprising:
   a step of admitting air under pressure into the cylinder during a scavenging phase which overlaps the exhaust stroke of the piston so as to scavenge the cylinder;
   a step of inducting air fuel mixture into the cylinder during the intake stroke of the piston;
   a step of admitting air under pressure into the cylinder during a swirl generating phase which overlaps the intake stroke of the piston so as to swirl said air fuel mixture around the cylinder axis; and
   a step of controlling said air fuel mixture in response to operating conditions of the engine such that
   under full load conditions of the engine, the air fuel ratio of said air fuel mixture is set so that the air fuel ratio (A/F) of the charge in the cylinder is from 12 to 14;
   under part load conditions of the engine, the air fuel ratio of said air fuel mixture is set so that the air fuel ratio (A/F) of the charge in the cylinder is not less than the stoichiometry; and
   under idle and deceleration conditions, the air fuel ratio of said air fuel mixture is set so that the air fuel ratio (A/F) of the charge in the cylinder is around the stoichiometry.

13. A four-stroke reciprocatory internal combustion engine comprising:
   a cylinder;
   a piston reciprocating in said cylinder;
   a cylinder head secured to said cylinder to close said cylinder, said cylinder, piston and cylinder head cooperating to form a combustion chamber;
   an intake means for inducting air fuel mixture into said cylinder during the intake stroke of said piston;
   an exhaust means for exhausting the exhaust gas resulting from the combustion of said air fuel mixture from said cylinder during the exhaust stroke of said piston; and
   an additional intake means for admitting air under pressure into said cylinder during a scavenging phase which overlaps the exhaust stroke of said piston, so as to scavenge said cylinder, and for admitting air under pressure into said cylinder during a swirl generating phase which overlaps the intake stroke of said piston so as to swirl said air fuel mixture around the cylinder axis of said cylinder.

14. An engine as claimed in claim 13, in which said intake means comprises an intake port bore extending through said cylinder head and opening to said combustion chamber, and an intake valve cooperating with said intake port bore; said exhaust means comprises an exhaust port bore extending through said cylinder head and opening to said combustion chamber, and an exhaust valve cooperating with said exhaust port bore; and said additional intake means comprises an additional intake port bore extending through said cylinder head and opening to said combustion chamber and an air inlet valve cooperating with said additional intake port bore.

15. An engine as claimed in claim 14, in which said additional intake means is so constructed and arranged as to cause inflowing air through said additional intake port bore to swirl around the cylinder axis of said cylinder, and in which said intake valve is disposed downstream of said air inlet valve with respect to the swirling air and said exhaust valve is disposed downstream of said intake valve with respect to the swirling air, whereby the efficiency of scavenging will be increased during said scavenging phase and inflowing of air fuel mixture through said intake port bore will not be resisted by the swirling air.

16. An engine as claimed in claim 15, in which a spark plug is mounted to said cylinder head with an electrode thereof exposed to said combustion chamber at a location positioned downstream of said intake valve and upstream of said exhaust valve, with respect to the swirling air.

17. An engine as claimed in claim 15, in which said air inlet valve has a valve shroud.

18. An engine as claimed in claim 15, in which said additional intake port bore is arranged so as to direct inflowing air to pass along the cylindrical wall of said cylinder.

19. An engine as claimed in claim 15, in which said additional intake port bore is configured to impart a force to inflowing air to swirl around the cylinder axis of said cylinder.

20. An engine as claimed in claim 16, in which said additional intake means comprises a means for controlling the amount of air to be admitted into said cylinder through said additional intake port bore during said scavenging phase and swirl generating phase in response to operating conditions of the engine.

21. An engine as claimed in claim 14, in which said additional intake means comprises: means for transferring the atmospheric air to said additional intake port bore under pressure above atmospheric pressure; a surge tank fluidly disposed intermediate said transferring means and said additional intake port bore; a passage means whereby air passes from said surge tank to said additional intake port bore; a flow control valve fluidly disposed in said passage means to control flow therethrough; a vacuum servo means for actuating said flow control valve; a source of constant vacuum; a vacuum passage connecting said source of constant vacuum to said vacuum servo means; an air bleed passage having one end connected to said vacuum passage and an opposite end opening to the atmosphere; a solenoid valve for controlling flow through said air bleed passage; and control circuit means for energizing said solenoid valve in response to operating conditions of the engine.

22. An engine as claimed in claim 14, in which said swirl generating phase overlaps and succeeds said scavenging phase.

23. An engine as claimed in claim 22, in which said air inlet valve opens to initiate said scavenging phase and closes to terminate said air injection phase, and in which the maximum valve lift of said air inlet valve during said scavenging phase before the top dead center position of said piston is higher than the maximum valve lift of said air inlet valve during said swirl generating phase after the top dead center position of said piston, whereby a great amount of air is admitted into said cylinder during said scavenging phase and the inflow velocity of air as admitted into said cylinder is increased during said swirl generating phase.

24. An engine as claimed in claim 23, in which the amount of air to be admitted into said cylinder during said scavenging phase before the top dead center position of said piston is more than approximately 50% of total amount of air to be admitted into said cylinder during said scavenging phase and during said swirl generating phase.

25. An engine as claimed in claim 23, in which the closing timing of said air inlet valve is delayed under part load conditions of the engine rather than under full load conditions of the engine.

26. An engine as claimed in claim 14, in which said swirl generating phase also overlaps the compression stroke of said piston.

27. An engine as claimed in claim 26, in which said air inlet valve opens to initiate said scavenging phase and closes to terminate said scavenging phase and said air inlet valve opens again to initiate said swirl generating phase and then closes to terminate said swirl generating phase, and in which the maximum valve lift of said air inlet valve during said scavenging phase is higher than the maximum valve lift of said air inlet valve during said swirl generating phase, whereby a great amount of air is admitted into said cylinder during said scavenging phase and the inflow velocity of air as admitted into said cylinder is increased during said swirl generating phase.

28. An engine as claimed in claim 20, in which, under full load conditions of the engine, the air fuel ratio of said air fuel mixture is set so that the air fuel ratio within said cylinder is approximately from 12 to 14 at the end of the intake stroke of said piston, and in which, under part load conditions of the engine, the air fuel ratio of said air fuel mixture is set so that the air fuel ratio within said cylinder is not less than the stoichiometry.

29. An engine as claimed in claim 21, in which said transferring means comprises an air pump operatively connected to the engine to be actuated thereby.

30. An engine as claimed in claim 20, in which said transferring means comprises an air compressor operatively connected to a turbine fluidly disposed in the exhaust gas issued from said engine.

31. In a method of operating an internal combustion engine, the steps of
  compressing air via a pump driven by said engine;
  storing the compressed air from said pump in a surge tank fluidly interposed between said pump and said engine;
  exhausting the combustion gases from the combustion chamber of said engine via an exhaust valve;
  scavenging the residual combustion gases from the combustion chamber by introducing compressed air into said combustion chamber by opening a first inlet valve which controls the fluid communication between said surge tank and said combustion chamber, during the final stage of the exhaust phase of said engine;
  inducting an air fuel mixture into said combustion chamber by opening a second inlet valve during an induction phase of said engine;
  swirling the air fuel charge in said combustion chamber by introducing compressed air from said surge tank into said combustion chamber by opening said first inlet valve during a portion of the induction phase of said engine so that said compressed air mixes with said air fuel mixture and induces the resultant air fuel charge to swirl in said combustion chamber;
  controlling the volume of compressed air permitted to flow from said surge tank to said combustion chamber by operating control valve means fluidly interposed between said surge tank and said combustion chamber; and
  operating said control valve means in response to signals produced by sensing engine speed and engine load.

32. A method of operating an internal combustion engine as claimed in claim 31, further comprising the step of:

instigating said step of swirling at the beginning of said induction phase so that compressed air is continuously introduced to said combustion chamber from said final stage of said exhaust phase to the end of said portion of said induction phase.

33. A method of operating an internal combustion engine as claimed in claim 31, further comprising the steps of:

instigating said step of swirling during the final stage of said induction phase; and continuing said step of swirling into the initial stage of the compression phase of said engine.

34. A method of operating an internal combustion engine as claimed in claim 31, further comprising the step of:

controlling the amount of air introduced into said combustion chamber through said first inlet valve during said scavenging step according to a schedule which increases with engine speed decrease and increase in induction vacuum respectively.

35. A method of operating an internal combustion engine as set forth in claim 31 further comprising the steps of:

inducing a high lift of said inlet valve during said step of scavenging so that an adequate volume of compressed air is introduced into said combustion chamber; and inducing a low lift of said inlet valve during said step of swirling so that a stream of high velocity compressed air is introduced into said combustion chamber so as to induce all of the charge in said combustion chamber to swirl therein.

36. In an internal combustion engine having a combustion chamber which takes the form of a single dicrete variable volume space;

a pump driven by said engine for compressing air;

a surge tank for storing the air compressed by said pump, said surge tank being fluidly interposed between said pump and said engine;

an exhaust valve operatively disposed with said engine for exhausting combustion gases from said combustion chamber during the exhaust phase of said engine;

a first inlet valve operatively disposed with said engine for controlling the fluid communication between said surge tank and said combustion chamber;

a second inlet valve operatively disposed with said engine for inducting a combustible air fuel mixture into said combustion chamber during an induction phase of said engine;

said first inlet valve being selectively openable to permit the introduction of said compressed air into said combustion chamber during the final portion of said exhaust phase to scavenge the residual combustion gases which tend to remain in the combustion chamber after the exhaust phase and during a portion of the induction phase of said engine so that compressed air mixes with said air fuel mixture and induces the resultant air fuel charge to swirl in said combustion chamber; and control valve means disposed between said surge tank and said first inlet valve for controlling the volume of compressed air permitted to flow from said surge tank toward said combustion chamber, said control valve means being responsive to signals indicative of engine speed and engine load.

37. An internal combustion engine as claimed in claim 36, wherein said first inlet valve is opened during the final portion of the exhaust phase of said engine and closed during the initial portion of said induction phase so that air is continuously introduced into said combustion chamber and said scavenging is immediately followed by said swirling.

38. An internal combustion engine as claimed in claim 36, wherein said first inlet valve is opened during the final portion of said exhaust phase, closed for the initial portion of the subsequent induction phase, opened during the final portion of said induction phase and maintained open into the initial portion of the subsequent compression phase.

39. An internal combustion engine as claimed in claim 36, wherein said control valve means controls the amount of air permitted to flow to the combustion chamber in accordance with a schedule which increases with increase in engine induction vacuum and decrease in engine speed respectively.

40. An internal combustion engine as claimed in claim 36, further comprising:

an inlet valve cam which has a high lift portion and a low lift portion, said high lift portion being arranged to lift said inlet valve during said exhaust phase so that a relatively large amount of compressed air is introduced into said combustion chamber to scavenge said residual combustion gases and said low lift portion lifts said inlet valve during said induction phase so that said compressed air is introduced into said combustion chamber with a high velocity for inducing said swirl.

* * * * *